(12) United States Patent
Mandalia et al.

(10) Patent No.: US 6,654,456 B1
(45) Date of Patent: Nov. 25, 2003

(54) MULTI-SERVICE COMMUNICATION SYSTEM AND METHOD

(75) Inventors: Baiju D. Mandalia, Boca Raton, FL (US); Ann-Marie W. Hoher, Weston, FL (US); Scott S. Joffe, Highland Beach, FL (US); Tommy R. Alcendor, Boynton Beach, FL (US); Ran R. Cohen, Haifa (IL); Uzi U. Shvadron, Mitzpe Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/521,361

(22) Filed: Mar. 8, 2000

(51) Int. Cl.[7] .............................................. H04M 7/00
(52) U.S. Cl. ................... 379/220.01; 370/352
(58) Field of Search .......................... 370/352; 379/219, 379/220.01

(56) References Cited

U.S. PATENT DOCUMENTS 6,292,481 B1 * 9/2001 Voit et al. .................... 370/352
6,438,105 B1 * 8/2002 Qarni et al. ................. 370/231

OTHER PUBLICATIONS

Cravotta, Nicholas; "Voice Over Packet—Putting It All Together", Electronic Magazine, Mar. 16, 2000, pp. 107–118.

* cited by examiner

Primary Examiner—Creighton Smith
(74) Attorney, Agent, or Firm—Richard A. Tomlin; Jon A. Gibbons; Fleit, Kain, Gibbons, Gutman, Bongini & Bianco P.L.

(57) ABSTRACT

A multi-service communication system and method is disclosed which permits the integration of traditional PSTN functions and voice-over-IP/voice-over-data (VOIP/VOD) functions within the same communication system. The extension of scripting functions to support these features in general simultaneously permits the script to interact with PSTN and IP telephones within the context of the same services, to share the same service logic for both PSTN and IP media, to conference participants on both PSTN and IP, to store and forward information between the two media, to play on-hold media to the interface, and/or to monitor information between the two media. In general the disclosed invention is amenable to the integration of PSTN and VOIP networks, but other service functions may be integrated with no loss of generality.

69 Claims, 8 Drawing Sheets

MULTI-SERVICE COMMUNICATION SYSTEM AND METHOD

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to public switched telephone networks (PSTN's)/voice-over-IP telephony and particularly to the application of the extension of scripts to interact with PSTN and IP telephones within the context of the same services.

BACKGROUND OF THE INVENTION

Overview

Today script based services are available to program interactive voice response devices when communicating with the public switched telephone network (PSTN). Today IP networks are evolving and voice over IP telephony is being used for communication similar to that of PSTN networks. The general problem with this scenario is that there is no common bridge to manage services that involved both PSTN and IP end-points in the same connection.

Description of the Prior Art

For example, the IBM IVR platform Direct Talk (reference IBM Direct Talk for AIX, V2, R2: State Tables, Prompts and Voice Segments, SC33-1846, December 1998) provides the script language used for PSTN interaction. In the present invention the script needed for interacting with IP telephones was developed and uses the same script method as Direct Talk and can coexist.

Objects of the Invention

Accordingly, the objects of the present invention are (among others) to circumvent the deficiencies in the prior art and affect the following objectives:

1. to extend the script to interact with PSTN and IP telephones within the context of the same services;
2. to share same service logic for both PSTN and IP media;
3. to conference participants on both PSTN and IP;
4. to store and forward information between the two media;
5. to play ON-HOLD media to with interface; and/or
6. to monitor information between the two media.

While these objectives should not be understood to limit the teachings of the present invention, in general these objectives are achieved by the disclosed invention that is discussed in the following sections.

BRIEF SUMMARY OF THE INVENTION

Overview

Referencing FIG. 1, in the present invention scripts have been extended to interact with PSTN and IP telephones within the context of the same services. In, the present invention, the scalable PSTN gateway (104, 113, 123, 125) is a gateway that connects calls from a PC-based H.323 client application (102, 115) to the regular PSTN telephone system (105, 112, 122, 126). Inbound calls originating from the PSTN are connected through an IP connection (103, 114, 124) to a PC client application (102, 115). Outbound calls originating from a PC client application are sent through the gateway to the PSTN destination. In addition, as illustrated in FIG. 1, Voice Over Data (VOD) may provide an optional RISC-based solution for routing PSTN calls over a data network, allowing three types of voice connections:

1. PC-to-phone (100);
2. phone-to-PC (110); and/or
3. phone-to-phone (120).

The gateway is scalable and has been reduced to practice to support up to 96 simultaneous calls, although any number is potentially realizable.

The following detailed discussion may serve as a guide for the VOD CS-Voice Over Data Custom Server and the SPN256 Port Resource Control Custom Server for VOD (SPRC). These APIs developed for the VOD Custom Server serve as extensions to the DT (IBM's Direct Talk Interactive Voice Response System), i.e., they receive commands from the DT. The Voice over Data custom server along with the DT form the basis of the scalabable PSTN Gateway. This Gateway is a multi-service system and server that runs on the AIX operating system. While this system uses the AIX operating system, it is not limited to this and can be implemented on another operating system. The multi-service system connects to the PSTN network. The multi-service system can also work without a telephone call. In addition, the multi-service system can service and IP call independently.

The set of exemplary state table APIs documented herein are designed as a DT interface to the actual custom server functions which support a gateway capable of sending and receiving voice between a telephone PSTN interface card and the IP (Internet Protocol) network. Calls are generally controlled utilizing the H.323 standard. The SPRC is responsible for coordinating the SCBus connections between the DTQA (Direct Talk Quad Adapter) and the SPN256, managing resources of the SPN256 cards, allocating and deallocating resources to the application. It is integrated with the DT Timeslot Manager, which uses Connection Servers to send low-level commands to the adapters sharing the SCBus (cable/logic standard for connecting time division multiplexed voice channels).

The operation of these APIs is designed especially for the requirements of the DT system, and are limited by its restrictions.

The VOD Custom Server is one component of a larger, more complex system and, in order to be able to use the VOD Custom Server, it is necessary to understand the DT with all its built-in components as well as other custom servers, such as Time Slot Manager, and VOD Gate Custom Server.

Exemplary Advantages

Overall the present invention can in some exemplary embodiments provide one or more of the following advantages over the prior art. For example the IBM IVR platform Direct Talk (reference IBM Direct Talk for AIX, V2, R2: State Tables, Prompts and Voice Segments, SC33-1846, December 1998) provides the script language used for PSTN interaction. In the present invention, the script needed for interacting with IP telephones was developed and uses the same script method as Direct Talk and can coexist with this application. A description of those APIs follows.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Embodiments are Exemplary

Figure 1:
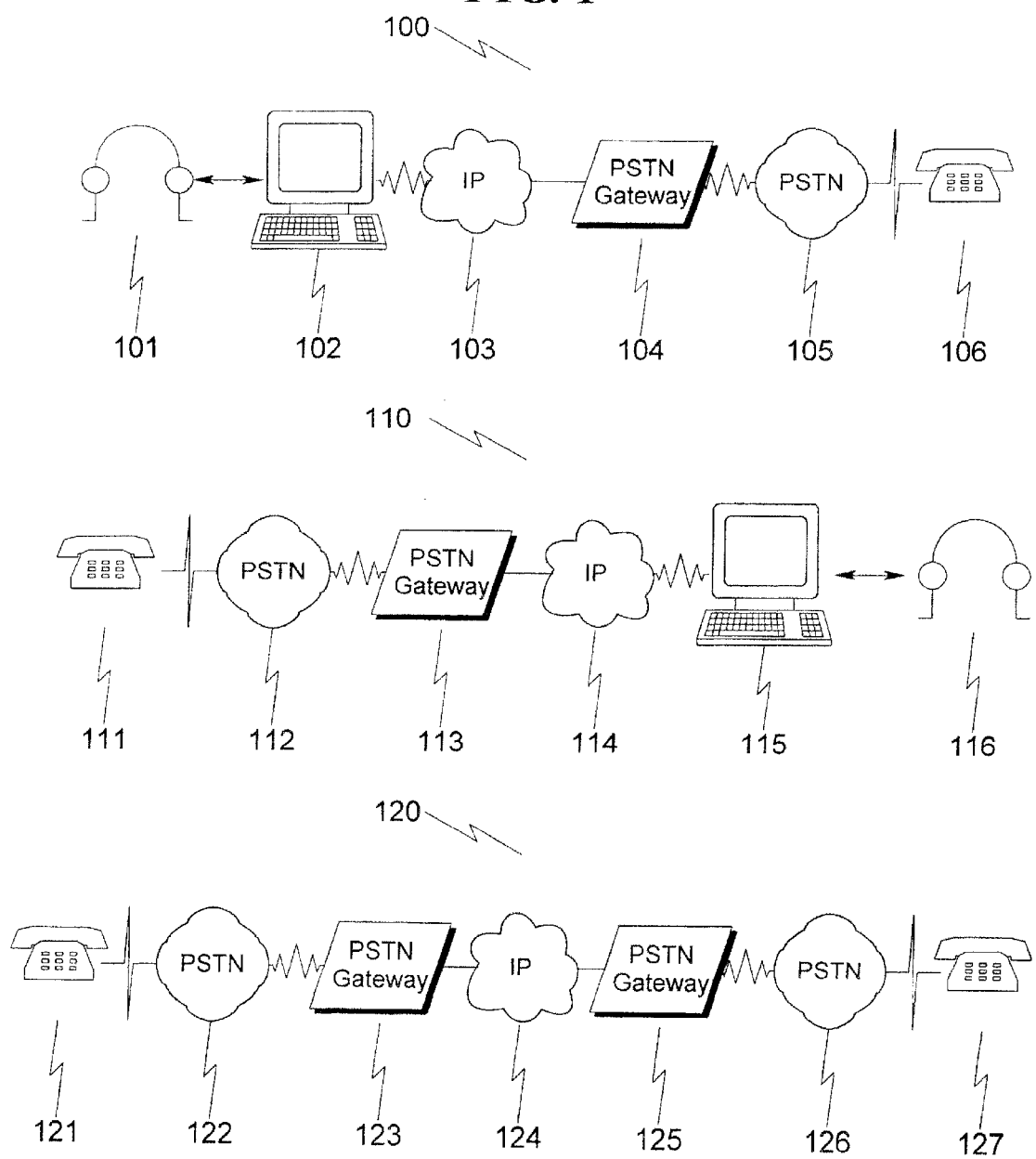
FIG. 1 illustrates exemplary system embodiments of the present invention in PC-to-phone, phone-to-PC, and phone-to-phone applications.
Figure 2:
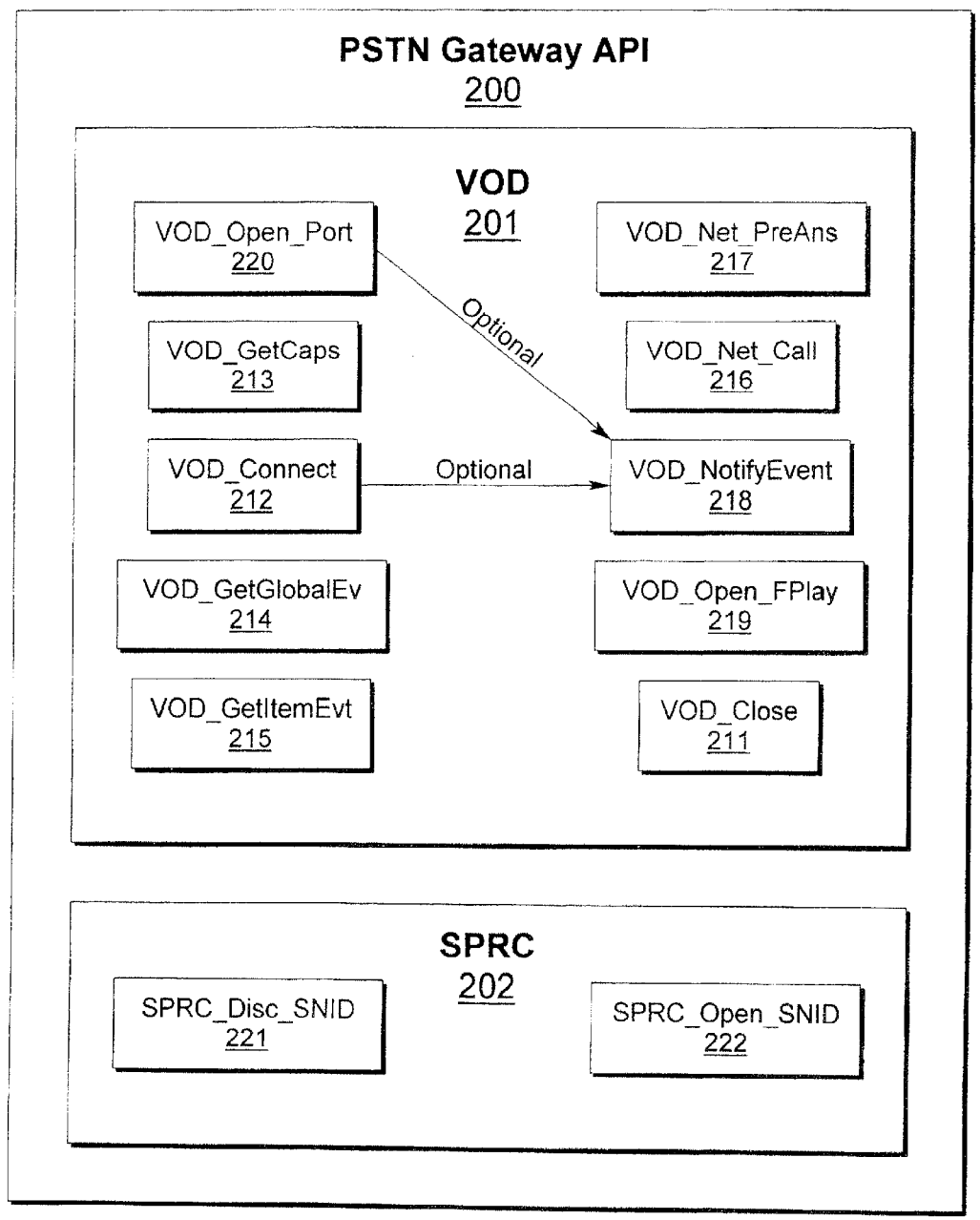
FIG. 2 illustrates an exemplary system architecture diagram for the API interfaces supporting the present invention teachings.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiments, wherein these innovative teachings are advantageously applied to the particular problems of a multi-service communication system and method. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions will be utilized:
Application Program Interface (API)
 The interface (calling conventions) by which an application program accesses operating system and other services. An API is defined at source code level and provides a level of abstraction between the application and the kernel (or other privileged utilities) to ensure the portability of the code.
E.1 64
 Standard for representing phone numbers and their translation.
Endpoint
 A software entity that represents the source and/or sink of voice information. Typically PSTN, network (H.323), or a file.
Gatekeeper
 A directory server that manages all authentication and name resolving of all users for the H.323. For more information, see "Gateway".
Gateway
 An interface that connects networks or system of different architecture. For example, a gateway may connect your computer to the World Wide Web, or your computer to the PSTN system—as it does in the case of the present invention.
GSM
 Global System for Mobile Communication standardized by ETSI (European Telecommunications Standards Institute). A standard for pan-European digital mobile communication.
G.723.1
 An ITU standard for voice compression.
H.323
 Standard for telephony over IP.
Handle
 A number indicating an item (Endpoint or connection between Endpoints).
Public Switched Telephone Network (PSTN)
 The collection of interconnected systems operated by the various telephone companies and administrations (telcos and PTTs) around the world. Also known as the Plain Old Telephone System (POTS).
SubNetwork ID (SNID)
 The port through which the call is being connected. This information is provided by other custom servers.
SPN256 Card
 IBM Artic960 DSP Resource adapter, RS/6000 feature 2949. Used for Voice Compression and decompression between PSTN and IP voice traffic. This particular hardware is exemplary of functionality that may be readily substituted by one skilled in the art.
System Blocks/Procedural Steps Not Limitive
 The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Synchronous/Asynchronous Process Steps Not Limitive

The present invention teaches a variety of processes and procedures that may be implemented to achieve the overall scope of the invention purpose. These steps may be performed either synchronously or asynchronously. Thus, the particular order of a given process is not Limitive of the scope of the present invention.

Personal Computer Not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Operating System Not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface. The present invention multi-services system is implemented in IBM'S AIX operating system but it should be understood that other operating systems are within the true scope and spirit of the present invention.

Data Structures Not Limitive

The present invention may be embodied in a variety of data structures in some preferred embodiments. However, the form of such data structures as described herein is only exemplary. One skilled in the art would quickly realize that a wide variety of other data structures could be used equivalently in this application. Therefore, no data structure contained herein should be interpreted as limiting the scope of the present invention.

Voice Not Limitive

Many preferred embodiments of the present invention will be described in the context of a VOIP application, in which voice is transmitted over the IP protocol. However, the teachings of the present invention can be applied to a wide variety of other audio, video, or multi-media applications, and thus while the VOIP application is illustrative of the teachings of the present invention, it is not Limitive as to the type of information communicated over the communications channel.

Exemplary Symbolics

The present invention may make use of a variety of exemplary input parameters, return codes, and status indicators throughout the system as implemented or in pieces of the system as implemented. The following sections provide some of the exemplary symbolics and exemplary values as implemented in some preferred embodiments of the present invention. One skilled in the art will quickly recognize that the complement of symbolics and their values may be reduced or augmented with no reduction in the scope of teachings of the present invention.

VOD Return Codes

The following table illustrates symbolics for VOD return codes and their exemplary numeric values:

| Error Number | Code | Explanation |
| --- | --- | --- |
| 0 | VOD_OK | API successful |
| −1 | VOD_ERROR | General internal error |
| −2 | VOD_MORE_DATA | Needs more space in the buffer |
| −5 | VOD_ILLEGAL_HANDLE | Illegal handle |
| −6 | VOD_ILLEGAL_PARAM | Illegal parameter |
| −7 | VOD_BAD_EP_TYPE | Illegal Endpoint type |
| −8 | VOD_BAD_STATE | The item is in a wrong state |
| −9 | VOD_TRY_AGAIN | May try again later |
| −10 | VOD_BUSY | Already created or busy doing something |
| −11 | VOD_NOT_FOUND | The item was not found |
| −50 | VOD_CANT_OPEN_SOCKET | Error opening sockets |
| −51 | VOD_NO_MORE_RESOURCES | No more resources |
| −60 | VOD_BAD_RESPOND | Response is not in the correct format (internal error) |
| −61 | VOD_RESPOND_ERROR | Response came with an error |
| −62 | VOD_TIMEOUT | Timeout has occurred for the operation |
| −70 | VOD_UNSUPPORTED | This feature is not yet supported |
| −100 | VOD_NOT_HANDLED | Message was not handled. |

Coder Capabilities

The following table illustrates symbolics for coder capabilities and their exemplary numeric values:

| coder_cap | Value | Explanation |
| --- | --- | --- |
| RTSE_CODER_NONE | 0 | Indicates the end of the list. |
| RTSE_CODER_GSM | 0x0100 | ETSI standard GSM coder 13.2 Kbit/sec. |
| RTSE_CODER_GSM_VQ | 0x0110 | HRL proprietary GSM product (not supported yet). |
| RTSE_CODER_G711_ULAW | 0x0200 | G.711 U-LAW. |
| RTSE_CODER_G711_ALAW | 0x0210 | G.711 A-LAW. |
| RTSE_CODER_G723 | 0x0300 | G.723.1 in 6.4 Kbit/sec. |
| RTSE_CODER_G723_64 | 0x0310 | G.723.1 in 6.4 Kbit/sec. |
| RTSE_CODER_G723_53 | 0x0320 | G.723.1 in 5.3 Kbit/sec (not supported yet). |
| RTSE_CODER_G729A | 0x0400 | G.729 annex A (not supported yet). |

VOD Net PreAns Possible Answers

The following table illustrates symbolics for possible answers to the VOD_Net_PreAns (217) function and their exemplary numeric values:

| Answer | Value | Explanation |
| --- | --- | --- |
| VOD_ANS_ACCEPT | 0x00 | User has picked up and is accepting the call. |
| VOD_ANS_REJECT | 0x01 | User has rejected the call. |
| VOD_ANS_BUSY | 0x02 | Line is busy. |
| VOD_INS_NOANSWER | 0x03 | User did not pick up within an acceptable time interval. |

VOD IP Status

The following table illustrates symbolics for possible IP status values and their exemplary numeric values:

| Status | Value | Explanation |
|---|---|---|
| STAT_FREE | 0 | This handle does not belong to any open item. |
| STAT_CREATED | 1 | The item's request is spawned and waiting to be handled (it is being processed). |
| STAT_SENT | 2 | The item's request is being processed. |
| STAT_READY | 3 | The item is ready to be connected (it is not already connected to any other Endpoint). |
| STAT_CONNECTED | 4 | STAT_SENT |
| Relevant only to an H.323 Endpoint | | |
| STAT_H323_PROC | 10 | The Endpoint is in the call proceeding stage. |
| STAT H323_ALERT | 11 | The Endpoint is in the call alerting stage. |
| STAT_H323_CONF | 12 | The Endpoint is in the call confirm stage. |

VOD Item Events

The following table illustrates symbolics for possible VOD item events and their exemplary numeric values:

| Answer | Value | Explanation |
|---|---|---|
| VOD_OREQ_HANGUP | 0x0120 | The user at the remote side of the H.323 Endpoint hung up. |
| VOD_OREQ ERROR | 0x0121 | An error occurred for this item. |
| VOD_OREQ_STATUS | 0x0122 | The status of the item has changed. |
| VOD_OREQ_READY | 0x0123 | The status changed to READY for the first time. |

The following table ilustrates simbolics for possible VOD hangup reasons and their exemplary numeric values.

| Value | Hangup Code | Reason Provided | Explanation |
|---|---|---|---|
| 272 | H323_RES_NORMAL | Remote user hung up | Normal call clearing initiated by user. |
| 273 | H323_RES_BUSY | Remote station busy | User busy. |
| 275 | H323_RES_NOANSWER | No answer | Called user has been alerted but did not answer within the timeout period. |
| 277 | H323_RES_REJECTED | Call rejected | Called user rejected the call. |
| 503 | H323_RES_NO_NW_RSC | Not enough network resources | The reservation of network resources failed. |
| 504 | H323_RES_NO_GK_RSC | Not enough gatekeeper resources | The gatekeeper does not have enough resources to forward the call. |
| 505 | H323_RES_UNREACH_DEST | Destination unreachable | The gateway could not forward the call. |
| 506 | H323_RES_DEST_REJ | Destination rejected | The gateway forwarded the call, but the end user did not accept it. |
| 507 | H323_RES_INV_REV | Invalid revision | Invalid software revision on the other side detected. |
| 508 | H323_RES_NO_PERM | No permission | The Endpoint did not get the permission from the gatekeeper to accept the call. |
| 509 | H323_RES_NO_GK | Unreachable gateway. | The gatekeeper could not be reached. |
| 510 | H323_RES_NO_GW_RSC | Not enough gateway resource | The gateway does not have enough resources to forward the call. |
| 511 | H323_RES_BAD_FMT_ADDR | Malformed address | The gateway detected a bad format of the e.164 number of the called user. |
| 512 | H323_RES_BAD_NO_QOS | Network overloaded | The endpoint detected a very low QOS that made the media connection unusable. |

| Value | Hangup Code | Reason Provided | Explanation |
|---|---|---|---|
| 267 | H323_RES_PROT_ERR | Protocol error. | A protocol error was detected or a ReleaseComplete message with this reason was received. |
| 268 | H323_RES_RELCOMP_UNSPEC | Unspecified hangup reason | The local service provider got a ReleaseComplete message with a code it did not understand or was undefined. |
| 769 | H323_RES_CTRL_CNX_EST_FAIL | No control connection | One of the control connections could not be established within a given timeout. |
| 770 | H323_RES_CTRL_CNX_LOST | Control connection lost | The control connection was unexpectedly lost. |
| 771 | H323_RES_CAPSEL_FAIL | Capability selection failed | The capability selection failed because no compatible set was found. |
| 772 | H323_RES_TOO_MANY_CALLS | Too many calls. | The local service provider is not able to make a new outgoing call because there are too many already. |
| 773 | H323_RES_BUG_SP | H323 implementation bug | The local service provider detected a software bug within itself. |
| 774 | H323_RES_BUG_SU | Application error | The local service provider believes that the service user is not conforming to the present specifications. |

Port Resource Control Custom Server (SPRC) Return Codes

General Errors

The following table illustrates symbolics for possible SPRC general errors and their exemplary numeric values:

General Errors

| Error Code | Value |
|---|---|
| SPRC_SUCCESS | 0x00 |
| SPRC_GENERAL_FAILURE | 0x01 |
| SPRC_INVALID_PARAMETER | 0x02 |
| SPRC_NOT_SUPPORTED | 0x03 |
| SPRC_ALREADY_IN_USE | 0x04 |
| SPRC_OUT_OF_RESOURCE | 0x05 |
| SPRC_OUT_OF_BOUNDS | 0x06 |
| SPRC_NO_MEMORY | 0x07 |
| SPRC_TIMEOUT | 0x08 |
| SPRC_ADAPTER_NOT_FOUND | 0x09 |

Shared Memory/Semaphore Errors

The following table illustrates symbolics for possible SPRC shared memory/semaphore errors and their exemplary numeric values:

Shared Memory/Semaphore Errors

| Error Code | Value |
|---|---|
| SPRC_UNABLE_DETTACH_SHM | 0x10 |
| SPRC_UNABLE_DESTROY_SHM | 0x11 |
| SPRC_UNABLE_ATTACH_SHM | 0x12 |
| SPRC_UNABLE_GET_SHM | 0x13 |
| SPRC_UNABLE_LOCK_SHM | 0x14 |
| SPRC_UNABLE_UNLOCK_SHM | 0x15 |
| SPRC_UNABLE_CREATE_SHM | 0x16 |
| SPRC_UNABLE_GET_SHM | 0x17 |
| SPRC_UNABLE_DESTROY_SHM | 0x18 |

TDM Errors

The following table illustrates symbolics for possible SPRC TDM errors and their exemplary numeric values:

TDM Errors

| Error Code | Value |
|---|---|
| SPRC_TDM_CONNECT_FAILURE | 0x1A (*) |
| SPRC_TDM_DISCONNECT_FAILURE | 0x1B (*) |
| SPRC_CONN_SERVER_NOT_READY | 0x1C |

(*) Note: return codes marked with (*) have the 8-digit hexadecimal format 0x'bb'0000'aa' where:
'aa' = is the error code of the table above (in hexadecimal)
'bb' = is the CA_errno variable from DirectTalk (in hexadecimal)

Connection Errors

The following table illustrates symbolics for possible SPRC connection errors and their exemplary numeric values:

| Connection Errors | |
|---|---|
| Error Code | Value |
| SPRC_CONNECTION_ERROR | 0x20 |
| SPRC_DISCONNECTION_ERROR | 0x21 |
| SPRC_DEALLOCATION_ERROR | 0x22 |
| SPRC_ALLOCATION_ERROR | 0x23 |
| SPRC_CONNECTION_NOT_POSSIBLE | 0x24 |
| SPRC_DISCONNECTION_NOT_POSSBILE | 0x25 |
| SPRC_DEALLOCATION_NOTPOSSIBLE | 0x26 |
| SPRC_ALLOCATION_NOT_POSSBILE | 0x27 |
| SPRC_INVALID_PEER_CARD_TYPE | 0x28 |
| SPRC_INVALID_PEER_CARD_NUMBER | 0x29 |
| SPRC_PEER_CHANNEL_OUT_OFRANGE | 0x2A |

Port Errors

The following table illustrates symbolics for possible SPRC port errors and their exemplary numeric values:

| Port Errors | |
|---|---|
| Error Code | Value |
| SPRC_PORTPIOT_YREE | 0x31 |
| SPRC_PORT_NOT_OPENED | 0x32 |
| SPRC_PORT_NOT_CONNECTED | 0x33 |

Conference General Errors

The following table illustrates symbolics for possible SPRC conference general errors and their exemplary numeric values:

| Conference General Errors | |
|---|---|
| Error Code | Value |
| SPRC_CONFERENCE_ID_OUT_OF_RANGE | 0x40 |
| SPRC_NO_CONFERENCE_AVAILABLE | 0x41 |
| SPRC_NULL_CONFERENCE | 0x42 |

Conference Queue Errors

The following table illustrates symbolics for possible SPRC conference queue errors and their exemplary numeric values:

| Conference Queue Errors | |
|---|---|
| Error Code | Value |
| SPRC_REMOVE_FROM_AVAIL_MIXER_QUEUE_ERROR | 0x50 |
| SPRC_REMOVE_FROM_USED_MIXER_QUEUE_ERROR | 0x51 |
| SPRC_REMOVE_FROM_BLOCKED_MIXER_QUEUE_ERROR | 0x52 |
| SPRC_ADD_TO_AVAIL_MIXER_QUEUE_ERROR | 0x53 |
| SPRC_ADD_TO_USED_MIXER_QUEUE_ERROR | 0x54 |
| SPRC_ADD_TO_BLOCKED_MIXER_UEUE_ERROR | 0x55 |
| SPRC_ADD_TO_AVAIL_CONFERENCE_QUEUE_ERROR | 0x56 |
| SPRC_ADD_TO_USED_CONFERENCE_QUEUE_ERROR | 0x57 |

Mixer Errors

The following table illustrates symbolics for possible SPRC mixer errors and their exemplary numeric values:

| Mixer Errors | |
|---|---|
| Error Code | Value |
| SPRC_MIXER_OUT_OF_RANGE | 0x60 |
| SPRC_MIXER_STATE_ERROR | 0x61 |
| SPRC_MIXER_NOT_ALLOCATED | 0x62 |
| SPRC_MIXER_NOT_CONNECTED | 0x63 |
| SPRC_MIXER_NOT_FREE | 0x64 |
| SPRC_MIXER_NOT_BLOCKED | 0x65 |
| SPRC_NO_MIXER_ALLOCATED | 0x66 |
| SPRC_NO_MIXER_AVAILABLE | 0x67 |
| SPRC_NO_MIXER_BLOCKED | 0x68 |
| SPRC_NULL_MIXER | 0x69 |
| SPRC_MIXER_CONNECTION_NOT_POSSIBLE | 0x6A |
| SPRC_MIXER_ALLOCATION_NOT_POSSIBLE | 0x6B |
| SPRC_MIXER_DISCONNECTION_NOT_POSSIBLE | 0x6C |
| SPRC_MIXER_DEALLOCATION_NOT_POSSIBLE | 0x6D |

EEC Errors

The following table illustrates symbolics for possible SPRC EEC errors and their exemplary numeric values:

| EEC Errors | |
|---|---|
| Error Code | Value |
| SPRC_EEC_NOT_FOUND | 0 × 70 |
| SPRC_EEC_OUT_OF_RANGE | 0 × 71 |
| SPRC_INVALID_EEC | 0 × 72 |
| SPRC_NO_EECS_ALLOCATED | 0 × 73 |
| SPRC_EEC_NOT_ALLOCATED | 0 × 74 |
| SPRC_EEC_NOT_CONNECTED | 0 × 75 |
| SPRC_EEC_CONNECTED_NOT_FOUND | 0 × 76 |
| SPRC_NO_EECS_AVAILABLE | 0 × 77 |

WanDriver Errors

The following table illustrates symbolics for possible SPRC WanDriver errors and their exemplary numeric values:

| WanDriver Errors | |
|---|---|
| Error Code | Value |
| SPRC_OSP_NUMBERS_UNMATCHED | 0 × 80 |
| SPRC_UNABLE_TO_OPEN_DEVICE | 0 × 81 |

-continued

WanDriver Errors

| Error Code | Value |
|---|---|
| SPRC_ERROR_TRANSMIT_TO_WAN_DRIVER | 0 × 82 |
| SPRC_ERROR_RECEIVING_FROM_WAN_DRIVER | 0 × 83 |
| SPRC_INVALID_COMMANDFROIv_WAN_DRIVER | 0 × 84 |
| SPRC_UNMATCHED_COMMAND_FROM_WAN_DRIVER | 0 × 85 |
| SPRC_WAN_DRIVER_EEC_ALREADY_CONNECTED | 0 × 86 |
| SPRC_WAN_DRIVER_EEC_OUT_OF_RANGE | 0 × 87 |
| SPRC_WAN_DRIVER_MIXER_OUT_OF_RANGE | 0 × 88 |
| SPRC_WAN_DRIVER_INVALID_COMMAND | 0 × 89 |
| SPRC_WAN_DRIVER_EEC_NC_TO_THE_MIXER | 0 × 8A |
| SPRC_WAN_DRIVER_EEC_NC_TO_ANY_MIXER | 0 × 8B |
| SPRC_WAN_DRIVER_IMPOSSIBLE_CONNECTION | 0 × 8C |
| SPRC_WAN_DRIVER_UNKNOWN_RC | 0 × 8D |
| SPRC_WAN_DRIVER_WAN_SID_ERROR | 0 × 8E |
| SPRC_WAN_DRIVER_WAN_REG_ERROR | 0 × 8F |
| SPRC_WAN_DRIVER_WAN_RX_POLLED_ERROR | 0 × 90 |
| SPRC_WAN_DRIVER_WAN_WC_CONNECT_ERROR | 0 × 91 |
| SPRC_WAN_DRIVER_WAN_WC_CONCNF_ERROR | 0 × 92 |

DSP Errors

The following table illustrates symbolics for possible SPRC DSP errors and their exemplary numeric values:

DSP Errors

| Error Code | Value |
|---|---|
| SPRC_DSP_OUT_OF_RANGE | 0 × A0 |

System Overview

The present invention generally can be viewed in terms of the exemplary system architecture. This exemplary architecture comprises the following components:
Voice-Over-Date (XOD) ComDonents (201)
 1. VOD_Close (211);
 2. VOD_Connect (212);
 3. VOD_GetCaps (213);
 4. VOD_GetGlobalEv (214);
 5. VOD_GetItemEvt (215);
 6. VOD_Net_Call (216);
 7. VOD_Net_PreAns (217);
 8. VOD_NotifyEvent (218);
 9. VOD_Open_FPlay (219); and
 10. VOD_Open_Port (220).
Port Resource Control Custom Server (SPRC) Components (202)
 1. SPRC_Disc_SNID (221)
 2. SPRC_Open_SNID (222)

State Table APIs Overview

Concept of the APIs

Since the basic functionality of the VOD Custom Server is to transfer voice (in real time) from several kinds of sources to several kinds of targets, the concept of the APIs is built of Endpoints and the connections between these Endpoints. The connections between the Endpoints have a particular direction that indicates the direction of the voice streaming. For example, to maintain a standard IP to PSTN phone call, one must open two Endpoints: an IP Endpoint and a PSTN Endpoint. To enable voice between them (in both directions) two Endpoints need to be connected in full duplex mode.

As another example, to record the PSTN side to a file, one must open the PSTN Endpoint (if it is not already open), and then open the file record Endpoint and connect the PSTN Endpoint to the record Endpoint in one direction (from PSTN to record). A more complex structure can be created with the restriction that an Endpoint can only have one output connection and one input connection.

The following describes the IBM Voice Over Data (VOD) and SPN256 Voice Over IP Port Resource Control (SPRC) state table APIs. They act as an interface between IBM's DirectTalk state Tables and the VOD/SPRC Custom Server API's. There are ten VOD state table APIs and two SPRC state table APIs

Exemplary State Table API Usage

PSTN Calls

Figure 3:
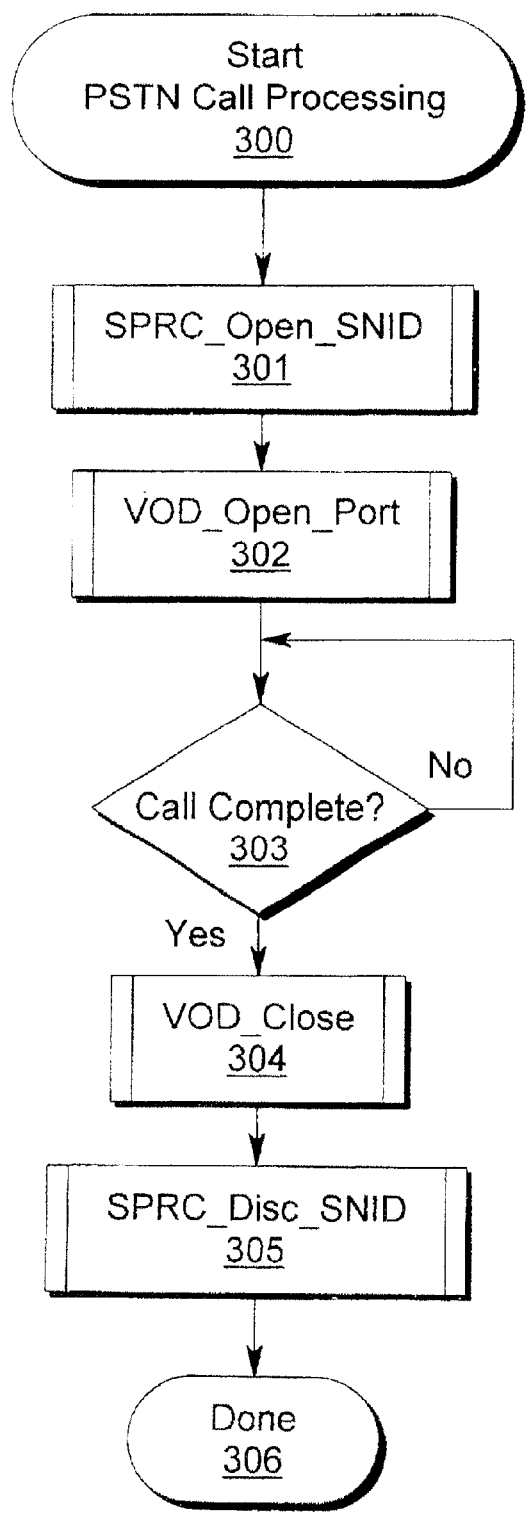
FIG. 3 illustrates an exemplary process flowchart for PSTN call processing.
Figure 4:
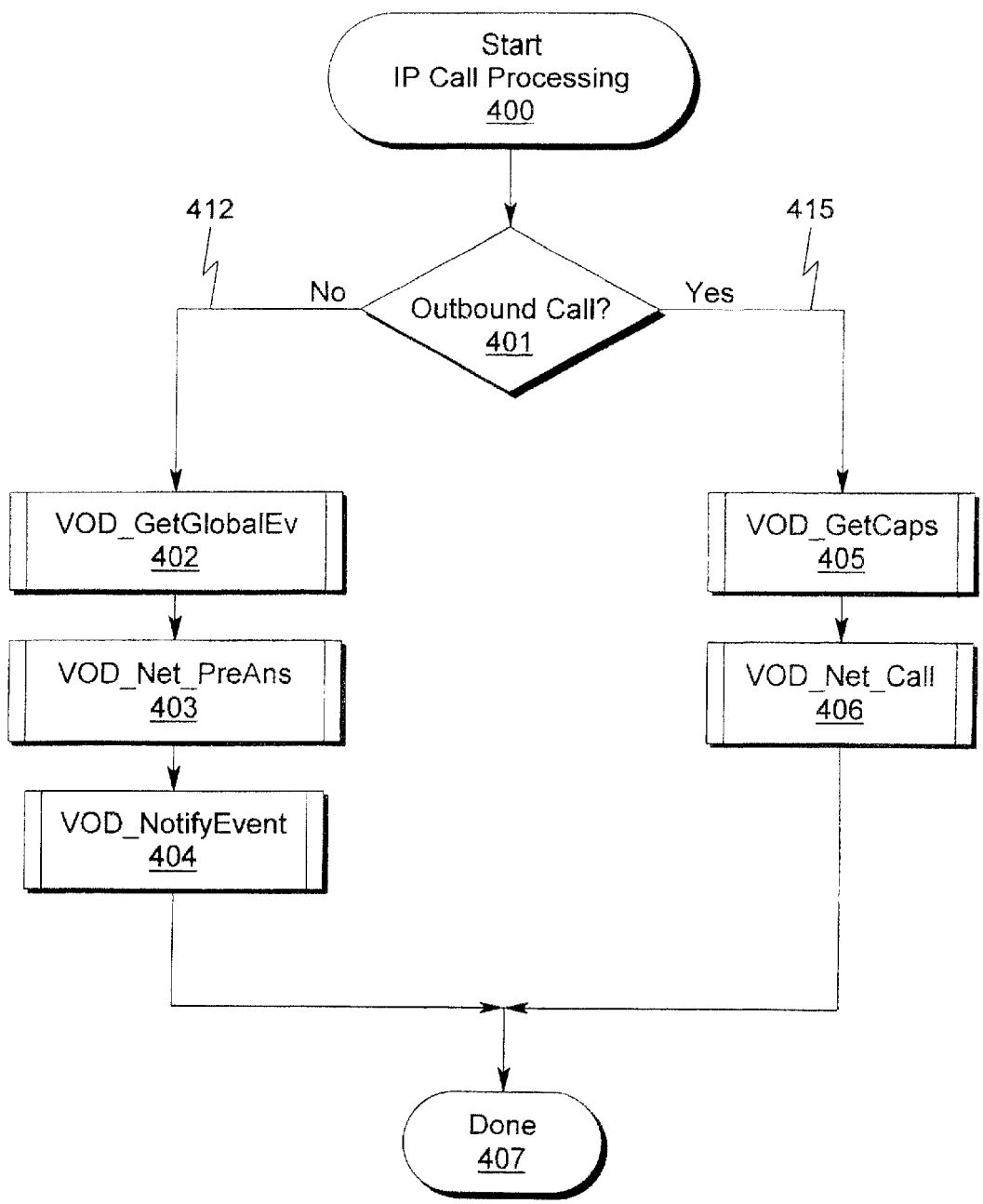
FIG. 4 illustrates an exemplary process flowchart for IP call processing.
Figure 5:
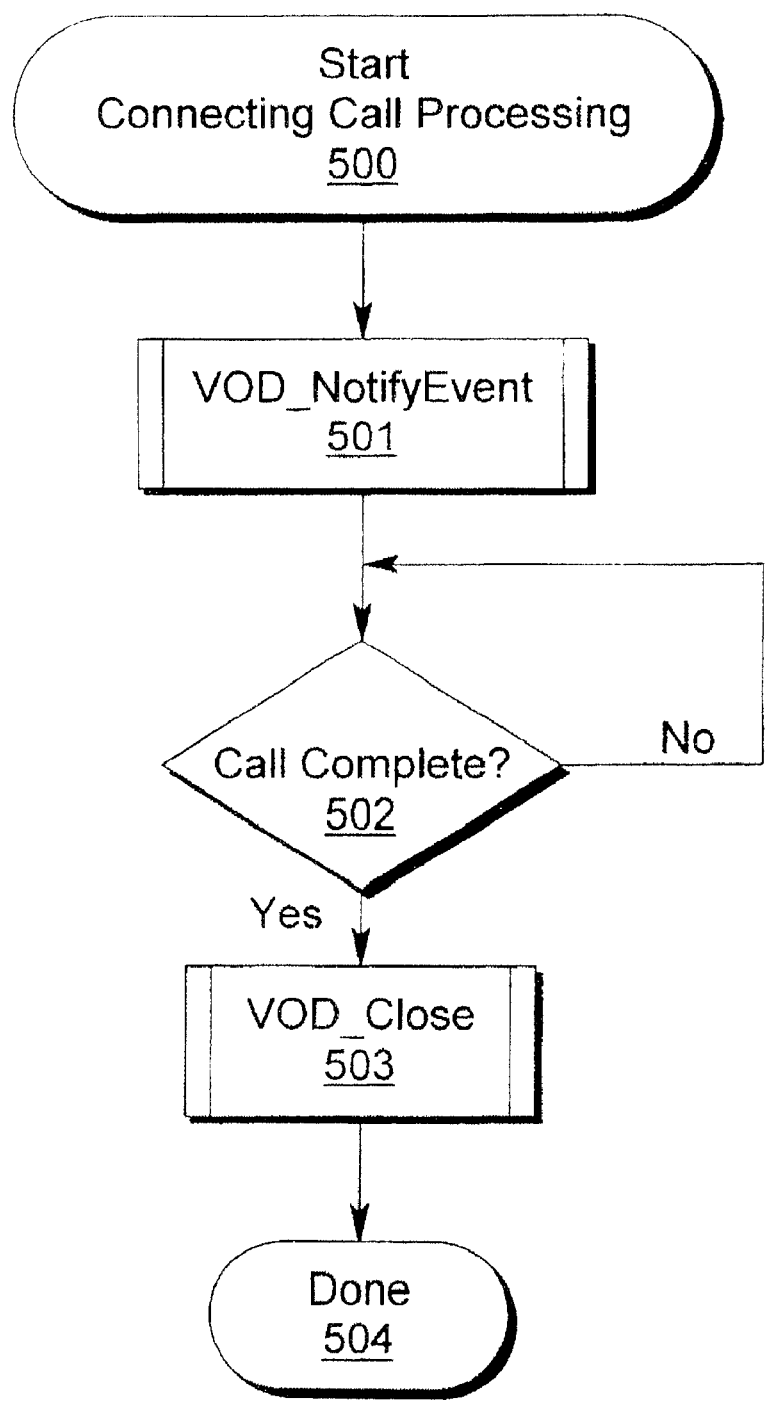
FIG. 5 illustrates an exemplary process flowchart for connecting call processing.
Figure 6:
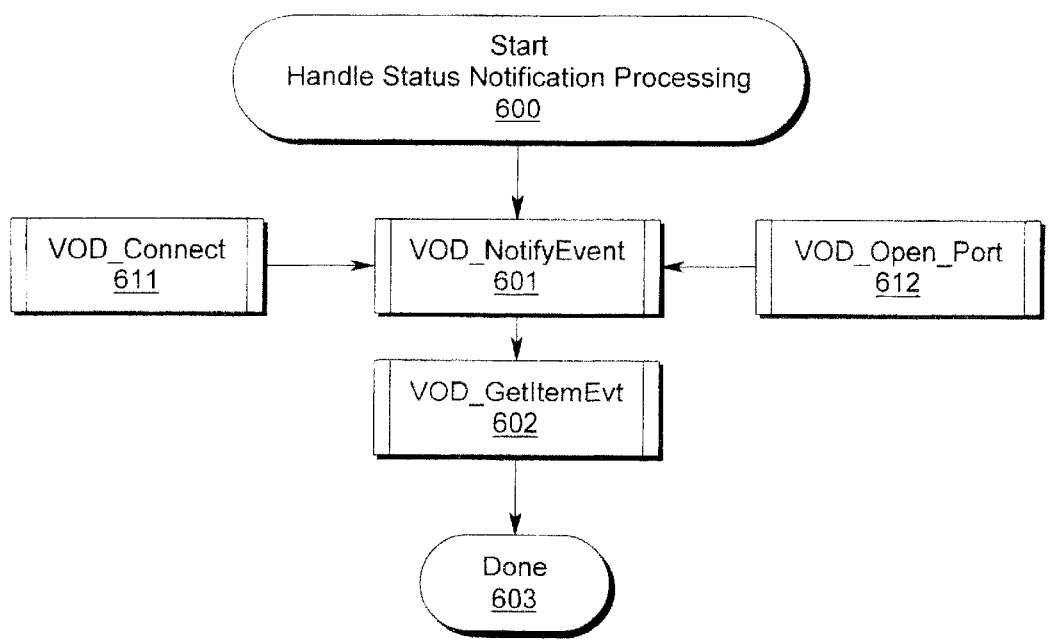
FIG. 6 illustrates an exemplary process flowchart for handle status notification processing.
Figure 7:
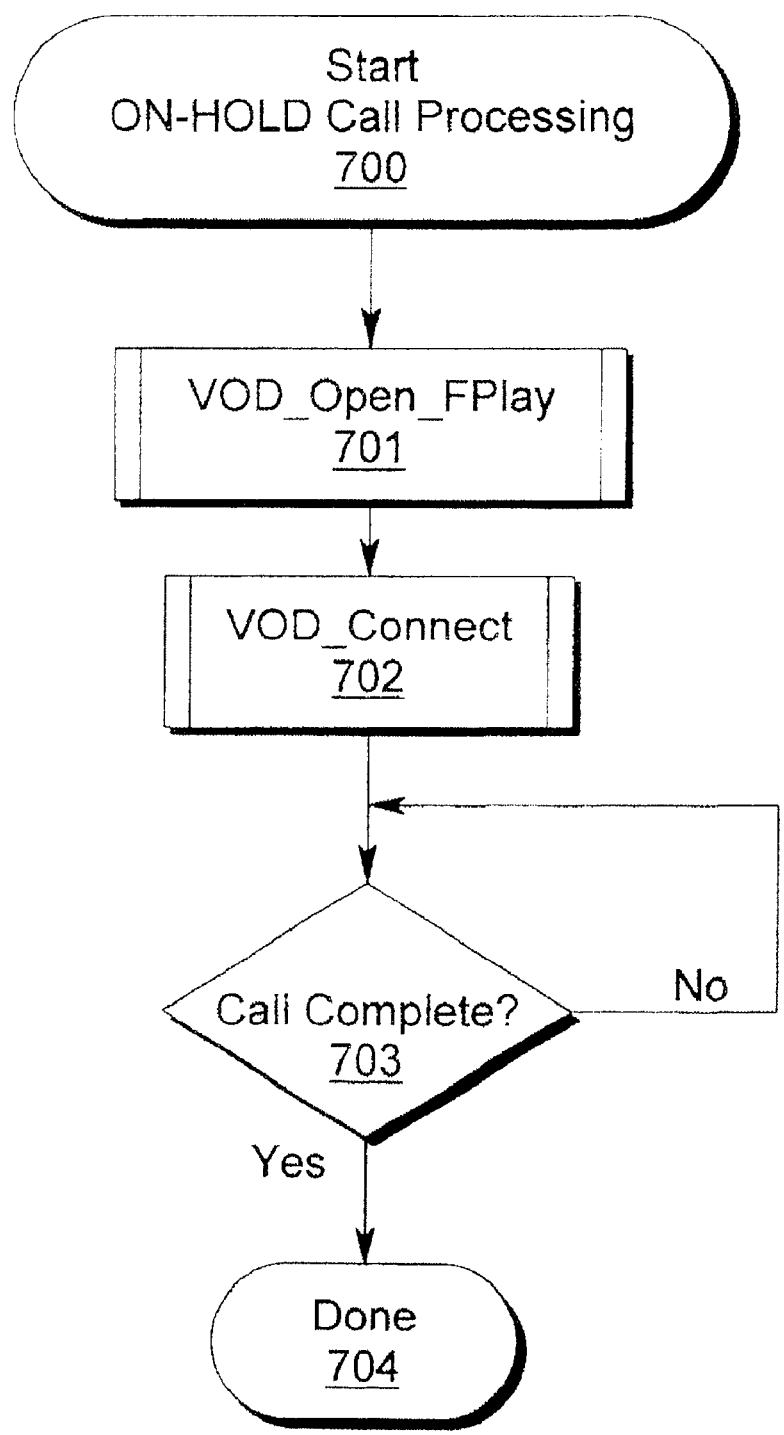
FIG. 7 illustrates an exemplary process flowchart for ON-HOLD call processing.

As illustrated in FIG. 3, when a call is received/made involving a PSTN port (300), the state table APIs used are:
 1. SPRC_Open_SNID (222) (301); and
 2. VOD_Open_Port (220) (302).
When the call is completed (303), the state table APIs used to free the associated resources for the PSTN port are:
 1. VOD_Close (211) (304); and
 2. SPRC_Disc_SNID (221) (305).
IP Calls As illustrated in FIG. 4, processing for inbound and outboud IP calls (400) is bifurcated (401). When a call is received involving an IP port (400), the state table APIs if the call is inbound (412) are:
 1. VOD_GetGlobalEv (214) (402);
 2. VOD_Net_PreAns (217) (403); and
 3. VOD_NotifyEvent (218) (404).
In the case where a VOD connection is to be established for an agent or an outbound call (415) to an IP address is to be made, the state table APIs used are:
 1. VOD_GetCaps (213) (405); and
 2. VOD_Net_Call (216) (406).
Connecting Calls As illustrated in FIG. 5, when two parties are to be connected (500), the state table APIs used are:
 1. VOD_NotifyEvent (218) (501).
When the call is completed (502), the state table APIs used to free the associated resources forth PSTN port are:
 1. OD_Close (211) (503).
Handle Status Notification As illustrated in FIG. 6, the VOD API has the ability to notify the state table of activity concerning a particular 'handle' (600). The state table APIs used to establish and use this function are:
 1. VOD_NotifyEvent (218) (601) (this function may be called by or included in VOD_Connect (212) (611) and VOD_Open_Port (220) (612)); and
 2. VOD_GetItemEvt (215) (602).
ON-HOLD Transfers As illustrated in FIG. 7, here is an additional function that provides the ability to play a file to an endpoint (i.e. music, advertisement) (700). The file must first be opened and then connected to the 'handle' that will hear the file. The state table APIs used to perform this function are:
 1. VOD_Open_FPlay (219) (701); and
 2. VOD_Connect (212) (702).

Exemplary Multi-Service System

Figure 8:
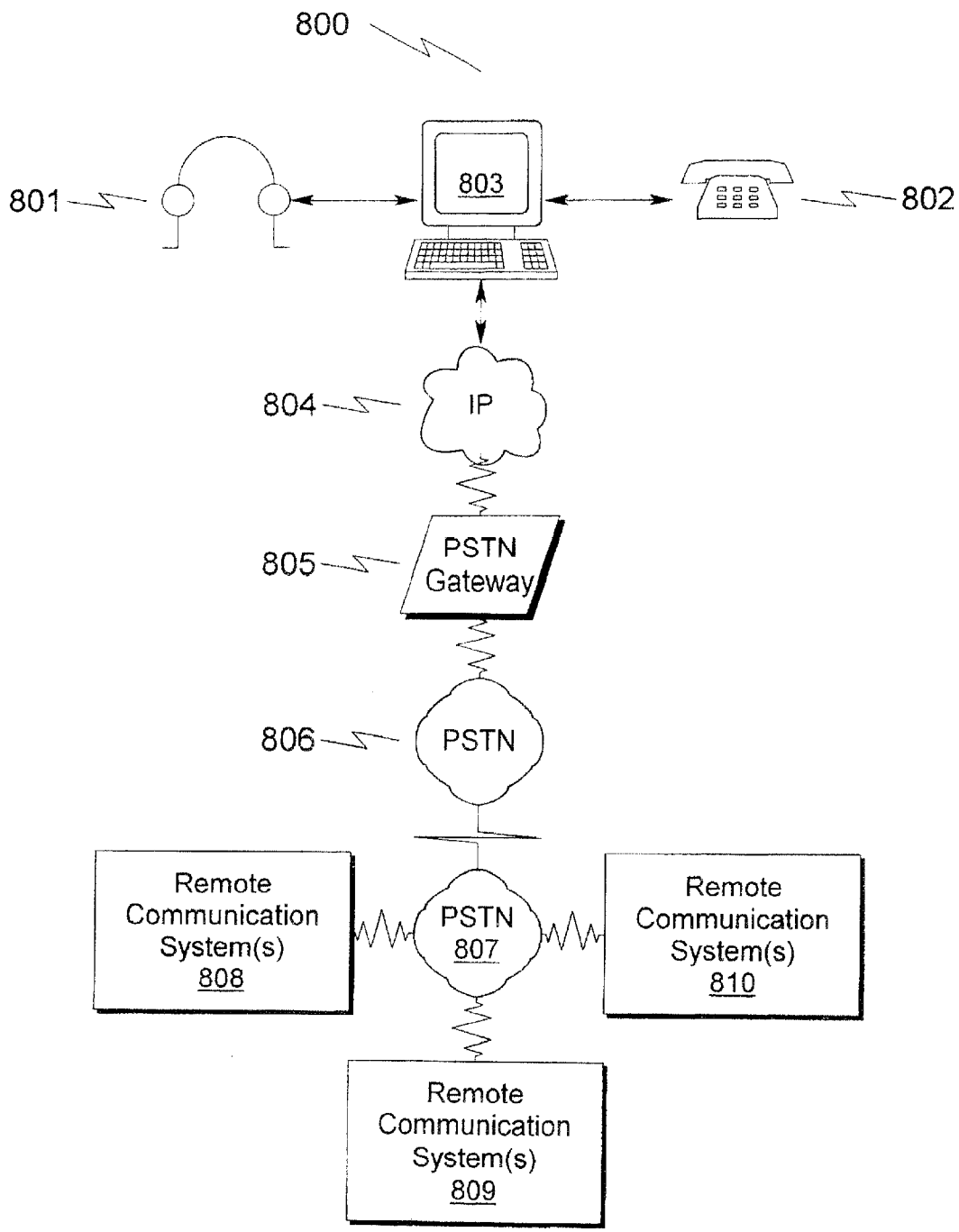
FIG. 8 illustrates an exemplary system embodiment showing full integration of VOD and PSTN applications.

Referencing FIG. 8, the concepts presented in FIGS. 1–7 may be integrated such as to permit voice (801), telephonic information (802), as well as other types of multi-media data to be interfaced to a personal computer (803) over an IP network (804) to a PSTN gateway (805) that interfaces with one (806) or more (807) PSTN networks to a variety of remote communication system(s) (808, 809, 810) which may or may not have a structure similar to that of the IP/PSTN gateway of FIG. 8. This figure illustrates the generic capabilities of the present invention extend beyond simple voice communication and may be utilized in some environments to include a wide variety of data, including but not limited to voice, video, and other multi-media components.

VOD State Table APIs

VOD Close (211)

Description

This state table API will perform two functions:
1. Disable notification (optional); and
2. Close an item (endpoint/handle or connection)

The state table will also do some preliminary checking of input parameters. If an input parameter is not valid, this state table API will return to the calling state table with a result of '1' and the 'Reason' field will contain information about the invalid parameter.

Input Parameters

| | |
|---|---|
| VOD_Handle (number): | the handle representing the endpoint or connection to be closed. Must be greater than 0. |
| Notify_flag (string): | Y or N to disable notification of handle status. If notification was turned on when the handle was established, it should be turned off at this point. |

Output Parameters

| | |
|---|---|
| rc (number): | return code from the Custom Server API. |
| 0 | = successful. Refer to Exemplary Symbolics (VOD Return Codes) for details on all other return codes. |
| Reason (string): | if this state table returns to the calling state table with a RESULT = 1 (not 'Return code'), this field will contain one of the following errors: |
| INVALID_HANDLE | = the input parameter VOD Handle was less than or equal to 0. |
| INVALID_NOTIFY_FLAG | = the input parameter Notify_flag was not Y or N VOD_Problem = the SendData or ReceiveData to the VOD custom server returned to this state table API with an unexpected state. |
| INTERNAL_ERROR | = the state table API had a system error (i.e. data mismatch, overflow, state table not invoked, etc.) |
| VOD_APIName (string): | this field contains the name of the custom server API that returned the 'Return code' parameter value. This is mainly used for debugging when the state table API interacts with more than one custom server API |

VOD Connect (212)

Description

This state table API will perform two functions:
1. Connects two endpoints/handles and starts the streaming between them.
2. Turn notification on for the connected handle (optional)

The state table will also do some preliminary checking of input parameters. If an input parameter is not valid, this state table API will return to the calling state table with a result of '1' and the 'Reason' field will contain information about the invalid parameter.

Input Parameters

| | |
|---|---|
| Handle1 (number): | the handle representing one endpoint. Must be greater than 0. |
| Handle2 (number): | the handle representing the other endpoint. Must be greater than 0. |
| Stream_dir (number): | The direction of streaming where: |
| 1 | = information goes from Handle 1 to Handle2 |
| 2 | = information goes from Handle2 to Handle1 |
| 3 | = streaming goes in both directions between Handle1 and Handle2 |
| Notify_flag (string): | Y or N to enable notification of handle status. |

Output Parameters

| | |
|---|---|
| Connect_handle (number): | the handle representing the connection between the two endpoints/handles. |
| rc (number): | return code from the Custom Server API |
| 0 | = successful. Refer to Exemplary Symbolics (VOD Return Codes) for details on all other return codes. |
| Reason (string): | if this state table returns to the calling state table with a RESULT = 1 (not 'Return code'), this field will contain one of the following errors: |
| INVALID_HANDLE1 | = the input parameter Handle 1 was less than or equal to 0. |
| INVALID_HANDLE2 | = the input parameter Handle2 was less than or equal to 0. |
| INVALID_NOTIFY_FLAG | = the input parameter Notify_flag was not Y or N |
| INVALID_STREAM_DIR | = the input parameter Stream dir was not 1, 2 or 3. |
| VOD_Problem | = the SendData or ReceiveData to the VOD custom server returned to this state table API with an unexpected state. |
| INTERNAL_ERROR | = the state table API had a system error (i.e. data mismatch, overflow, state table not invoked, etc.) |
| VOD_APIName (string): | this field contains the name of the custom server API that returned the 'Return code' parameter value. This is mainly used for debugging when the state table API interacts with more than one custom server API |

VOD GetCags (213)

Description

This state table will get the currently configured 'CODEC' (coder/encoder) (also referred to as coder capabilities).

Input Parameters
 NONE

Output Parameters

| | |
|---|---|
| rc (number): | return code from the Custom Server API |
| 0 | = successful. Refer to Exemplary Symbolics (VOD Return Codes) for details on all other return codes. |
| Reason (string): | if this state table returns to the calling state table with a RESULT = 1 (not 'Return code'), this field will contain one of the following errors. |

| | |
|---|---|
| VOD_Problem | = the SendData or ReceiveData to the VOD custom server returned to this state table API with an unexpected state. |
| INTERNAL_ERROR | = the state table API had a system error (i.e. data mismatch, overflow, state table not invoked, etc.) |
| VOD_API Name (string): | this field contains the name of the custom server API that returned the 'Return code' parameter value. This is mainly used for debugging when the state table API interacts with more than one custom server API. |
| caps (number): | configuration of tasks running in the SPN256 (for more details refer to the "VOD Custom Server APIs Users Guide" |

VOD GetGlobalEv (214)
  Description
  This state table API will poll for outbound request events. These requests indicate that some H.323 entity is trying to establish a connection to the gateway (is calling the application—for instance, an inbound call from an IP source).
Input Parameters
  NONE
Output Parameters

| | |
|---|---|
| rc (number): 0 | return code from the Custom Server API = successful. Refer to Exemplary Symbolics (VOD Return Codes) for details on all other return codes. |
| Reason (string): | if this state table returns to the calling state table with a RESULT = 1 (not 'Return code'), this field will contain one of the following errors. |
| VOD_Problem | = the SendData or ReceiveData to the VOD custom server returned to this state table API with an unexpected state. |
| INTERNAL_ERROR | = the state table API had a system error (i.e. data mismatch, overflow, state table not invoked, etc.) |
| VOD_APIName (string): | this field contains the name of the custom server API that returned the 'Return code' parameter value. This is mainly used for debugging when the state table API interacts with more than one custom server API |
| Event_Type (number): 0 0 x I110 Caller_uuid (number): Caller_H323 (number): | May be one of the following values: = no events (requests) present = (int 65688) outbound call attempted |
| Caller_IP (string): | IP address of the caller |
| Caller number (string): | the number of the PSTN call to be initiated. |

VOD GetItemEvt (215)
  Description
  This state table API will get more information about an event that was reported to the calling state table via the 'WaitEvent' DT function. If an item did not send an event, but an event was posted, this can be used to poll the event's status. The state table will also do some preliminary checking of input parameters. If an input parameter is not valid, this state table API will return to the calling state table with a result of '1' and the 'Reason' field will contain information about the invalid parameter.
Input Parameters

| | |
|---|---|
| Handle (number): | the handle to be used for the query of events. Must be greater than 0. |

Output Parameters

| | |
|---|---|
| rc (number): 0 | return code from the Custom Server API = successful. Refer to Exemplary Symbolics (VOD Return Codes) for details on all other return codes. |
| Reason (string): | if this state table returns to the calling state table with a RESULT = 1 (not 'Return code'), this field will contain one of the following errors. |
| INVALID_HANDLE | = the input parameter Handle was less than or equal to 0. |
| VOD_Problem | = the SendData or ReceiveData to the VOD custom server returned to this state table API with an unexpected state. |
| INTERNAL_ERROR | = the state table API had a system error (i.e. data mismatch, overflow, state table not invoked, etc.) |
| VOD_APIName (string): | this field contains the name of the custom server API that returned the 'Return code' parameter value. This is mainly used for debugging when the state table API interacts with more than one custom server API. |
| Event_Type (number): | When no event has been received, this field = 0. Other values are: |
| VOD_OREQ_HANGUP | = (0 x 0120 = 288) the user at the remote side of the H.323 endpoint hung up. |
| VOD_OREQ_ERROR | = (0 x 0121 = 289) an error occurred for this item. |
| VOD_OREQ_STATUS | = (0 x 0122 = 290) the status of the item has changed. |
| VOD_OREQ_READY | = (0 x 0123 = 291) the status changed to READY for the first time. |
| Event_Info1 (string): | additional information pertaining to this event. |
| Event_Info2 (string): | more information pertaining to this event. |

VOD Net Call (216)
  Description
  This state table API will initiate an IP outgoing call. In the Call Center scenario, this is used when indication is received that an outbound call is being initiated by an IP port via VOD_GetGlobalEv (214) (in other words, the initiating call is from an IP address and connection with them as the inbound caller must be established). When the handshaking is finished, the state of the handle will go into READY and an event will be sent. Therefore, in order to know the outcome of the API, the status of the handle needs to be polled using VOD_GetItemEvt (215) or wait for the event after issuing VOD_NotifyEvent (218) and DT/6's Wait-Event. The state table will also do some preliminary checking of input parameters. If an input parameter is not valid, this state table API will return to the calling state table with a result of '1' and the 'Reason' field will contain information about the invalid parameter.
Input Parameters

| | |
|---|---|
| Dest_IP_Address (string): | IP address of the party being called. Must not be blank. |
| Dest_Phone_Number (string): | the phone number to be called when the party is a gateway. Leave blank, if party is not a gateway (i.e. agent). |

-continued

| | |
|---|---|
| Coder Caps (number): | the current CODEC of the SPN256. Refer to Exemplary Symbolics (Coder Capabilities) for expected values. |

Output Parameters

| | |
|---|---|
| rc (number): 0 | return code from the Custom Server API = successful. Refer to Exemplary Symbolics (VOD Return Codes) for details on all other return codes. |
| Reason (string): | if this state table returns to the calling state table with a RESULT = 1 (not 'Return code'), this field will contain one of the following errors: |
| INVALID_IP_ADDRESS | = the input parameter Dest_IP_Address was invalid. |
| NO_IP_ADDRESS | = the input parameter Dest_IP_Address was blank. |
| VOD_Problem | = the SendData or ReceiveData to the VOD custom server returned to this state table API with an unexpected state. |
| INTERNAL_ERROR | = the state table API had a system error (i.e. data mismatch, overflow, state table not invoked, etc.) |
| VOD_APIName (string): | this field contains the name of the custom server API that returned the 'Return code' parameter value. This is mainly used for debugging when the state table API interacts with more than one custom server API |
| Handle (number): | if the call is successful, the handle of this IP client endpoint. |

VOD Net PreAns (217)

Description

This state table API will confirm that a request was received for an outbound call and is being processed. The state table will also do some preliminary checking of input parameters. If an input parameter is not valid, this state table API will return to the calling state table with a result of '1' and the 'Reason' field will contain information about the invalid parameter.

Input Parameters

| | |
|---|---|
| H323_Entry (number): | H.323 of the client (received from VOD_GetGlobalEv (214)). Must be greater than 0. |
| Answer (number): | Possible values are Accept (0 × 00 = 0), Reject (0 × 01 = 1), Busy (0 × 02 = 2), No Answer (0 × 03 = 3). Refer to Exemplary Symbolics (VOD_Net_PreAns (217) Possible Answers) for further details. |
| Coder_Caps (number): | the current CODEC of the SPN256. Refer to Exemplary Symbolics (Coder Capabilities) for expected values. |

Output Parameters

| | |
|---|---|
| rc (number): 0 | return code from the Custom Server API = successful. Refer to Exemplary Symbolics (VOD Return Codes) for details on all other return codes. |
| Reason (string): | if this state table returns to the calling state table with a RESULT = 1 (not 'Return code'), this field will contain one of the following errors. |
| INVALID_H323_ENTRY | = the input parameter H323_Entry was not greater than 0. |
| INVALID_ANSWER | = the input parameter Answer was not greater than 0. |
| VOD_Problem | = the SendData or ReceiveData to the VOD custom server returned to this state table API with an unexpected state. |
| INTERNAL_ERROR | = the state table API had a system error (i.e. data mismatch, overflow, state table not invoked, etc.) |
| VOD_APIName (string): | this field contains the name of the custom server API that returned the 'Return code' parameter value. This is mainly used for debugging when the state table API interacts with more than one custom server API |
| Handle (number): | if successful, the handle of this IP client endpoint. |

VOD NotifyEvent (218)

Description

This state table API will enable or disable notification to the DT state table of events concerning VOD 'handle'. Notification will be received by the DT 'WaitEvent' function, as a Host Event. Once the Host Event has been detected, the state table must issue VOD_GetItemEvt (215) to get details on the event. The state table will also do some preliminary checking of input parameters. If an input parameter is not valid, this state table API will return to the calling state table with a result of '1' and the 'Reason' field will contain information about the invalid parameter.

Input Parameters

| | |
|---|---|
| handle (number): | handle for the endpoint for which event information is being retrieved. Must be greater than 0. |
| Notify_flag (string): | 1 = enable, 0 = disable. |

Output Parameters

| | |
|---|---|
| rc (number): 0 | return code from the Custom Server API = successful. Refer to Exemplary Symbolics (VOD Return Codes) for details on all other return codes. |
| Reason (string): | if this state table returns to the calling state table with a RESULT = 1 (not 'Return code'), this field will contain one of the following errors. |
| INVALID_NOTIFY_FLAG | = the input parameter Notify_flag was not Y or N |
| INVALID_HANDLE | = the input parameter handle was not greater than 0. |
| VOD_Problem | = the SendData or ReceiveData to the VOD custom server returned to this state table API with an unexpected state. |
| INTERNAL_ERROR | = the state table API had a system error (i.e. data mismatch, overflow, state table not invoked, etc.) |
| VOD_APIName (string): | this field contains the name of the custom server API that returned the 'Return code' parameter value. This is mainly used for debugging when the state table API interacts with more than one custom server API |

VOD Open FPlay (219)

Description

This state table API will open a specified file and send the voice message from this file to the connected endpoint/handle. The file content must be in the correct voice format that is used in the connected endpoint/handle. This does not play the file, but rather 'open' it to be played. In order to actually play the file, this state table API should be followed by VOD_Connect (212), to connect the handle received from this API to the handle of the endpoint that should hear this file. The state table will also do some preliminary checking of input parameters. If an input parameter is not valid, this state table API will return to the calling state table with a result of '1' and the 'Reason' field will contain information about the invalid parameter.

Input Parameters

| | |
|---|---|
| File_Name (string): | the name of the file to be played. Must not be blank. |
| Loop_Flag (string): | how to play the file. |
| 0 | = play once |
| 1 | = repeat continuously. |
| Coder_Caps (number): | the current CODEC of the SPN256. Refer to Exemplary Symbolics (Coder Capabilities) for expected values. |

Output Parameters

| | |
|---|---|
| rc (number): | return code from the Custom Server API |
| 0 | = successful. Refer to Exemplary Symbolics (VOD Return Codes) for details on all other return codes. |
| Reason (string): | if this state table returns to the calling state table with a RESULT = 1 (not 'Return code'), this field will contain one of the following errors. |
| INVALID_FILE_NAME | = the input parameter File_Name was blank. |
| INVALID_LOOP_FLAG | = the input parameter Loop_Flag was not 0 or 1. |
| VOD_Problem | = the SendData or ReceiveData to the VOD custom server returned to this state table API with an unexpected state. |
| INTERNAL_ERROR | = the state table API had a system error (i.e. data mismatch, overflow, state table not invoked, etc.) |
| VOD_APIName (string): | this field contains the name of the custom server API that returned the 'Return code' parameter value. This is mainly used for debugging when the state table API interacts with more than one custom server API |
| Handle (number): | handle for this file endpoint. Will be used in the subsequent VOD_Connect. |

VOD Open Port (220)

Description

This state table API will perform two functions:

1. Open a connection to the telephone interface card: opens a SNID with the appropriate number and all voice will pass through
2. Turn notification on for the new handle (optional). The state table will also do some preliminary checking of input parameters. If an input parameter is not valid, this state table API will return to the calling state table with a result of '1' and the 'Reason' field will contain information about the invalid parameter.

Input Parameters

| | |
|---|---|
| snid (number): | the port number of the call on the telephony hardware interface card. This is gotten via SPRC_Open_SNID (222). Must be greater than 0. |
| encoder (number): | the output coder t0 the PSTN. Refer to Exemplary Symbolics (Coder Capabilities) for expected values. |
| decoder (number): | the input coder from the PSTN. Refer to Exemplary Symbolics (Coder Capabilities) for expected values. |
| Notify_YN (string): | Y or N to enable notification of handle status. |

Output Parameters

| | |
|---|---|
| rc (number): | return code from the Custom Server API Refer to Exemplary Symbolics (VOD Return Codes) for details on all other return codes. |
| Reason (string): | if this state table returns to the calling state table with a RESULT = 1 (not 'Return code'), this field will contain one of the following errors. |
| INVALID_SNID | = the input parameter snid was less than or equal to 0. |
| INVALID_NOTIFY_FLAG | = the input parameter Notify_YN was not Y or N |
| VOD_Problem | = the SendData or ReceiveData to the VOD custom server returned to this state table API with an unexpected state. |
| INTERNAL_ERROR | = the state table API had a system error (i.e. data mismatch, overflow, state table not invoked, etc.) |
| APIName (string): | this field contains the name of the custom server API that returned the 'Return code' parameter value. This is mainly used for debugging when the state table API interacts with more than one custom server API |
| handle (number): | the handle of this PSTN endpoint. |

SPRC Disc SNID (221)

Description

This state table API will perform two functions:

1. close the connection between an SPACK (DTQA) port set and an SPN256 port set.
2. close the SPN256 port set and deallocate the SPN256 port The state table will also do some preliminary checking of input parameters. If an input parameter is not valid, this state table API will return to the calling state table with a result of '1' and the 'Reason' field will contain information about the invalid parameter.

Input Parameters

| | |
|---|---|
| dtqa_chan (number): | the DTQA channel to be disconnected. Must be greater than 0. In DT, typically use system parameter SV 165: Channel number. |
| snid (number): | SNID associated to the SPN256 port to be disconnected and deallocated. |

Output Parameters

| rc (number): 0 | return code from the Custom Server API = successful. Refer to Exemplary Symbolics (SPRC Return Codes) for details on all other return codes. |
| --- | --- |
| Reason (string): | if this state table returns to the calling state table with a RESULT = 1 (not 'Return code'), this field will contain one of the following errors. |
| INVALID_SNID | = the input parameter snid was less than or equal to 0. |
| INVALID_DTQA_ CHANNEL | = the input parameter dtqa_chan was not greater than 0. |
| SPRC_PROBLEM | = the SendData or ReceiveData to the SPRC custom server returned to this state table API with an unexpected state. |
| INTERNAL_ERROR | = the state table API had a system error (i.e. data mismatch, overflow, state table not invoked, etc.) |
| APIName (string): | this field contains the name of the custom server API that returned the 'Return code' parameter value. This is mainly used for debugging when the state table API interacts with more than one custom server API |

SPRC Open SNID (222)
  Description
  This state table API will perform two functions:
  1. allocate a bidirectional port in the SPN256.
  2. connect an SPACK (DTQA) port set to a SPN256 port set.
The state table will also do some preliminary checking of input parameters. If an input parameter is not valid, this state table API will return to the calling state table with a result of '1' and the 'Reason' field will contain information about the invalid parameter.
Input Parameters

| dtqa_chan (number): | DTQA channel where call arrived, to be connected to the SPN256 port. |
| --- | --- |

Output Parameters

| rc (number): 0 | return code from the Custom Server API = successful. Refer to Exemplary Symbolics (SPRC Return Codes) for details on all other return codes. |
| --- | --- |
| Reason (string): | if this state table returns to the calling state table with a RESULT = 1 (not 'Return code'), this field will contain one of the following errors. |
| INVALID_SNID | = the input parameter snid was less than or equal to 0. |
| INVALID_DTQA_ CHANNEL | = the input parameter dtqa_chan was not greater than 0. |
| SPRC_PROBLEM | = the SendData or ReceiveData to the SPRC custom server returned to this state table API with an unexpected state. |
| INTERNAL_ERROR | = the state table API had a system error (i.e. data mismatch, overflow, state table not invoked, etc.) |
| APIName (string): | this field contains the name of the custom server API that returned the 'Return code' parameter value. This is mainly used for debugging when the state table API interacts with more than one custom server API |
| snid (number): | SNID associated to the preallocated SPN256 port to be connected. |

Method

As described previously in reference to the flowcharts of FIGS. 3–7, the present invention may incorporate a variety of methods to implement the functions described herein. While the API flowcharts detailed previously are exemplary of a preferred method of implementation, one skilled in the art will readily be able to augment these teachings, and as such they are not limitive of the scope of the present invention. One skilled in the art will recognize that these steps may be rearranged and/or augmented with no loss of generality in the teachings of the present invention.

The teachings of the present invention are sufficiently broad to not limit the manner in which the above-mentioned steps are to be performed as well as not limiting the method to any particular hardware, operating system, API, or graphical user interface. Thus, while the particular information gathered within the context of the flowcharts provided and the specific function calls listed in the exemplary flowcharts are preferred for some embodiments, they are by no means limitive of the present invention teachings or the scope thereof.

Computer Software

As would be known by one skilled in the art and as indicated in the exemplary embodiments of FIGS. 1–8, the system and method described herein and generally illustrated in FIGS. 1–8 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limiting the scope of the present invention, the present invention specifically anticipates that one or more components of the present invention may be implemented using the AIX®operating environment in all its variations or its equivalent commercial embodiments, including but not limited to any system incorporating a graphical user interface.

Conclusion

A multi-service communication system and method has been disclosed which permits the integration of traditional PSTN functions and voice-over-IP/voice-over-data (VOIP/VOD) functions within the same communication system. The extension of scripting functions to support these features in general simultaneously permits the script to interact with PSTN and IP telephones within the context of the same services, to share the same service logic for both PSTN and IP media, to conference participants on both PSTN and IP, to store and forward information between the two media, to play on-hold media to the interface, and/or to monitor information between the two media. In general the disclosed invention is amenable to the integration of PSTN and VOIP networks, but other service functions may be integrated with no loss of generality.

Although a preferred embodiment of the present invention has been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A multi-service communication system comprising:
   a PSTN interface means;
   a PSTN gateway client application means;
   an IP interface means;
   wherein said PSTN gateway means permits at least one of a uni-directional and a bi-directional communication between said PSTN Interface means and sold IP interface means,
   wherein one or more components of said system is implemented on a multi-services server
   wherein said multi-services server utilizes a graphical user interface;
   wherein said graphical user interface utilizes a Unix-based operating environment.

2. The multi-service communication system of claim 1 wherein said PSTN gateway means further comprises:
   a VOD_Close means;
   VOD_Connect means;
   VOD_GetCaps means;
   VOD_GetGlobalEv means;
   VOD_GetItemEvt means;
   VOD_Close means;
   a VOD_Net_Call means;
   a VOD_Net_PreAns means;
   VOD_NotifyEvent means;
   VOD_Open_FPlay means; and
   a VOD_Open_Port means.

3. The multi-service communication system of claim 2 wherein one or more components of said system is implemented within an application programming interface (API).

4. The multi-service communication system of claim 2 wherein said communication occurs between PC-to-phone endpoints.

5. The multi-service communication system of claim 2 wherein said communication occurs between phone-to-PC endpoints.

6. The multi-service communication system of claim 2 wherein said communication occurs between phone-to-phone endpoints.

7. The multi-service communication system of claim 9 wherein one or more components of said system is implemented on a multi-services server.

8. The multi-service communication system of claim 7 wherein said multi-services server utilizes a graphical user interface.

9. The multi-service communication system of claim 8 wherein said graphical user interface utilizes a AIX®operating environment.

10. The multi-service communication system of claim 2 wherein said PSTN gateway means further comprises:
    a SPRC_Disc_SNID means; and
    a SPRC_Open_SNID means.

11. The multi-service communication system of claim 10 wherein one or more components of said system is implemented within an application programming interface (API).

12. The multi-service communication system of claim 10 wherein said communication occurs between PC-to-phone endpoints.

13. The multi-service communication system of claim 10 wherein said communication occurs between phone-to-PC endpoints.

14. The multi-service communication system of claim 10 wherein said communication occurs between phone-to-phone endpoints.

15. The multi-service communication system of claim 10 wherein one or more components of said system is implemented on a multi-services server.

16. The multi-service communication system of claim 15 wherein said multi-services server utilizes a graphical user interface.

17. The multi-service communication system of claim 16 wherein said graphical user interface utilizes a AIX®operating environment.

18. A multi-service communication method comprising:
    processing PSTN calls with a PSTN call processing process means;
    processing IP calls with an IP call processing process means;
    processing connecting calls with a connecting call processing process means;
    processing handle status notifications with a handle status notification processing process means;
    processing ON-HOLD calls with an ON-HOLD call processing process means,
    wherein
    said processing may be performed at least one of synchronously and asynchronously.

19. The multi-service communication method of claim 18 wherein one or more steps of said method is implemented within an application programming interface (API).

20. The multi-service communication method of claim 18 wherein said communication occurs between PC-to-phone endpoints.

21. The multi-service communication method of claim 18 wherein said communication occurs between phone-to-PC endpoints.

22. The multi-service communication method of claim 18 wherein said communication occurs between phone-to-phone endpoints.

23. The multi-service communication method of claim 18 wherein one or more steps is implemented on a multi-services server.

24. The multi-service communication method of claim 23 wherein said multi-services server utilizes a graphical user interface.

25. The multi-service communication method of claim 24 wherein said graphical user interface utilizes a AIX®operating environment.

26. The multi-service communication method of claim 18 wherein said PSTN call processing step further comprises:
    activating a SPRC_Open_SNID process means;
    activating a VOD_Open_Port process means;
    waiting for call completion;
    activating a VOD_Close process means; and
    activating a SPRC_Disc_SNID process means.

27. The multi-service communication method of claim 26 wherein one or more steps of said method is implemented within an application programming interface (API).

28. The multi-service communication method of claim 26 wherein said communication occurs between PC-to-phone endpoints.

29. The multi-service communication method of claim 26 wherein sold communication occurs between phone-to-PC endpoints.

30. The multi-service communication method of claim 26 wherein said communication occurs between phone-to-phone endpoints.

31. The multi-service communication method of claim 26 wherein one or more steps is implemented on a multi-services server.

32. The multi-service communication method of claim 31 wherein said multi-services server utilizes a graphical user interface.

33. The multi-service communication method of claim 32 wherein said graphical user interface utilizes a AIX®operating environment.

34. The multi-service communication method of claim 18 wherein said IP call processing step further comprises:

determining if said call is outbound, and if so, proceeding to stop (5);

activating a VOD_Get_GlobalEv process means;

activating a VOD_Net_PreAns process means;

activating a VOD_NotifyEvent process means and terminating processing;

activating a VOD_GetCaps process means; and activating a VOD_Net_Call process means and terminating processing.

35. The multi-service communication method of claim 34 wherein one or more steps of said method is implemented within an application programming interface (API).

36. The multi-service communication method of claim 34 wherein said communication occurs between PC-to-phone endpoints.

37. The multi-service communication method of claim 34 wherein said communication occurs between phone-to-PC endpoints.

38. The multi-service communication method of claim 34 wherein said communication occurs between phone-to-phone endpoints.

39. The multi-service communication method of claim 34 wherein one or more steps is implemented on a multi-services server.

40. The multi-service communication method of claim 39 wherein said multi-services server utilizes a graphical user interface.

41. The multi-service communication method of claim 40 wherein said graphical user interface utilizes a AIX®operating environment.

42. The multi-service communication method of claim 18 wherein said connecting call processing step further comprises:

activating a VOD_NotifyEvent process means;

waiting for call completion; and activating a VOD_Close process means.

43. The multi-service communication method of claim 42 wherein one or more steps of said method is implemented within an application programming interface (API).

44. The multi-service communication method of claim 42 wherein said communication occurs between PC-to-phone endpoints.

45. The multi-service communication method of claim 42 wherein said communication occurs between phone-to-PC endpoints.

46. The multi-service communication method of claim 42 wherein said communication occurs between phone-to-phone endpoints.

47. The multi-service communication method of claim 42 wherein one or more steps is implemented on a multi-services Server.

48. The multi-service communication method of claim 47 wherein said multi-services server utilizes a graphical user interface.

49. The multi-service communication method of claim 48 wherein said graphical user interface utilizes a AIX®operating environment.

50. The multi-service communication method of claim 18 wherein said handle status notification processing step further comprises:

activating a VOD_NotifyEvent process means in at least of one of singly and in response to at least one requests from a VOD_Connect process means and a VOD_Open_Port process means; and activating a VOD_GetItemEvt process means.

51. The multi-service communication method of claim 50 wherein one or more steps of said method is implemented within an application programming interface (API).

52. The multi-service communication method of claim 50 wherein said communication occurs between PC-to-phone endpoints.

53. The multi-service communication method of claim 50 wherein said communication occurs between phone-to-PC endpoints.

54. The multi-service communication method of claim 50 wherein said communication occurs between phone-to-phone endpoints.

55. The multi-service communication method of claim 50 wherein one or more steps is implemented on a multi-services server.

56. The multi-service communication method of claim 55 wherein said multi-services server utilizes a graphical user interface.

57. The multi-service communication method of claim 56 wherein said graphical user interface utilizes a AIX®operating environment.

58. The multi-service communication method of claim 18 wherein said ON-HOLD call processing step further comprises:

activating a VOD_Open_FPlay process means;

activating a VOD_Connect process means; and waiting for call completion.

59. The multi-service communication method of claim 58 wherein one or more steps of said method is implemented within an application programming interface (API).

60. The multi-service communication method of claim 58 wherein said communication occurs between PC-to-phone endpoints.

61. The multi-service communication method of claim 58 wherein said communication occurs between phone-to-PC endpoints.

62. The multi-service communication method of claim 58 wherein said communication occurs between phone-to-phone endpoints.

63. The multi-service communication method of claim 58 wherein one or more steps is implemented on a multi-server.

64. The multi-service communication method of claim 63 wherein said multi-service utilizes a graphical user interface.

65. The multi-service communication method of claim 64 wherein said graphical user interface utilizes a AIX®operating environment.

66. A computer usable medium having computer-readable program code means providing multi-service communication, said computer-readable program means comprising:

computer program code means for processing PSTN calls with a PSTN call processing process means;
    computer program code means for processing IP calls with an IP call processing process means;
    computer program code means for processing connecting calls with a connecting call processing process means;
    computer program code means for processing handle status notifications with a handle status notification processing process means;
    computer program code means for processing ON-HOLD calls with en ON-HOLD call processing process means.

67. The computer usable medium of claim 66 wherein said medium is compatible with a multi-services server.

68. The computer usable modium of claim 67 wherein said computer code means utilizes a graphical user interface.

69. The computer usable medium of claim 68 wherein said graphical user interface utilizes a AIX®operating environment.

* * * * *

UNITED STATES PATENT AND TRADEMARK OFFICE
CERTIFICATE OF CORRECTION

PATENT NO. : 6,654,456 B1
APPLICATION NO. : 09/521361
DATED : November 25, 2003
INVENTOR(S) : Mandalia, et al.

It is certified that error appears in the above-identified patent and that said Letters Patent is hereby corrected as shown below:

In Claim 1, line 17, delete "sold" and insert therefor "said".

Signed and Sealed this

Eleventh Day of July, 2006

JON W. DUDAS
*Director of the United States Patent and Trademark Office*